(12) United States Patent
Kim et al.

(10) Patent No.: US 7,869,804 B2
(45) Date of Patent: *Jan. 11, 2011

(54) METHOD FOR AUTOMATICALLY SEARCHING WIRELESS LAN ACCESS POINT AND TERMINAL FOR PROCESSING THE SAME

(75) Inventors: Jin-Kyeong Kim, Daejeon (KR); Nam-Hoon Park, Daejeon (KR); Dae-Sik Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1170 days.

This patent is subject to a terminal disclaimer.

(21) Appl. No.: 10/537,846

(22) PCT Filed: Dec. 30, 2002

(86) PCT No.: PCT/KR02/02500

§ 371 (c)(1),
(2), (4) Date: Jan. 4, 2006

(87) PCT Pub. No.: WO2004/054137

PCT Pub. Date: Jun. 24, 2004

(65) Prior Publication Data

US 2006/0148487 A1      Jul. 6, 2006

(30) Foreign Application Priority Data

Dec. 12, 2002    (KR) .................... 10-2002-0079224

(51) Int. Cl.
*H04W 4/00* (2009.01)
(52) U.S. Cl. ............... 455/434; 455/432.1; 455/435.1; 455/456.1; 455/456.5; 455/456.6
(58) Field of Classification Search .............. 455/434, 455/432.1, 435.1, 456.1–456.6
See application file for complete search history.

(56) References Cited

U.S. PATENT DOCUMENTS

| 6,233,452 | B1 | 5/2001 | Nishino | |
| 2002/0187780 | A1* | 12/2002 | Souissi | 455/426 |
| 2003/0040314 | A1* | 2/2003 | Hogan et al. | 455/435 |
| 2003/0118015 | A1* | 6/2003 | Gunnarsson et al. | 370/389 |

FOREIGN PATENT DOCUMENTS

EP    1098477    5/2001

(Continued)

*Primary Examiner*—Vincent P Harper
*Assistant Examiner*—Dung Lam
(74) *Attorney, Agent, or Firm*—Ladas & Parry LLP

(57) ABSTRACT

Disclosed is a method for automatically searching a wireless LAN AP (access point) in a terminal having a wireless LAN module, a mobile communication module, and a GPS receiving module installed therein. The method comprises: (a) acquiring location information of the wireless LAN AP provided in a service area of a base station from the base station connected through the mobile communication module; (b) consecutively tracking a current location of the terminal through the GPS receiving module; (c) determining a driving start time of the wireless LAN module through the location information of the wireless LAN AP acquired in (a) and the current location information of the terminal tracked in (b); and (d) driving the wireless LAN module to detect a beacon signal periodically output by the wireless LAN AP.

9 Claims, 3 Drawing Sheets

FOREIGN PATENT DOCUMENTS

| | | |
|---|---|---|
| JP | 2000-333258 A | 11/2000 |
| JP | 2001-060910 A | 3/2001 |
| JP | 2001-095058 | 4/2001 |
| JP | 2001-245358 | 9/2001 |
| JP | 2001-268621 A | 9/2001 |
| JP | 2002-156478 A | 5/2002 |
| JP | 2002-199426 A | 7/2002 |
| JP | 2002-236632 A | 8/2002 |
| KR | 1020010004627 | 1/2001 |
| WO | WO01/22662 | 3/2001 |

* cited by examiner

| 41 | 42 |
|---|---|
| AP geographical location | AP radius of service |

# METHOD FOR AUTOMATICALLY SEARCHING WIRELESS LAN ACCESS POINT AND TERMINAL FOR PROCESSING THE SAME

CROSS REFERENCE TO RELATED APPLICATION

This application claims priority to and the benefit of Korea Patent Application No. 2002-79224 filed on Dec. 12, 2002 in the Korean Intellectual Property Office, the content of which is incorporated herein by reference.

BACKGROUND OF THE INVENTION (a) Field of the Invention

The present invention relates to a method for automatically searching a wireless LAN AP (access point). More specifically, the present invention relates to a method for automatically searching a wireless LAN AP based on wireless LAN AP location information provided within a service area of a base station and terminal location information through a GPS (global positioning system), and a terminal for performing the method.

(b) Description of the Related Art

Mobile communication service providers provide data services through mobile communication modules (IS-95 or 3G), but data service fees through the mobile communication modules are too expensive and the services provide very slow data rates, and hence, they are not activated.

To remedy this, a wireless LAN module is mounted together with the mobile communication module so that any users may receive high-speed data services inexpensively through the wireless LAN module other than the mobile communication module when the wireless LAN AP is available.

It is required for the wireless LAN module to detect a beacon signal output by the wireless LAN AP in operation in order to determine whether the wireless LAN AP is currently operated in a terminal that has a wireless LAN module installed therein. When the beacon signal is detected, the wireless LAN module allows the user to receive the data service through the corresponding wireless LAN AP.

Since the wireless LAN AP has a limitation of providing the service in specific areas, the combination of the wireless LAN module and the mobile communication module represents the combination of their merits.

When the terminal which has the wireless LAN module and the mobile communication module (referred to as a dual terminal hereinafter) installed therein attempts to receive the data service through a wireless LAN AP, the dual terminal is to detect the beacon signal output by the wireless LAN AP.

FIG. 1 shows a process for consecutively detecting a beacon signal of the wireless LAN AP while the dual terminal moves.

As shown, the dual terminal 11 can receive the data service through a wireless LAN when it arrives at the service area 14 of the wireless LAN AP 13, that is, the area where the beacon signal is allowable, through a plurality of paths.

Since the wireless LAN AP is not installed in all areas, but is provided in some public places where many people are gathered who may use the data service, the dual terminal must repeatedly detect the beacon signal output by the wireless LAN AP through the wireless LAN module. Therefore, when the dual terminal is located within the area where no wireless LAN AP is provided, the dual terminal operates the wireless LAN module and exhausts its power so as to detect a wireless LAN AP in operation.

Further, the user can randomly operate the wireless LAN module in places where the wireless LAN AP appears to be available without operating the wireless LAN module at their discretion in order to solve the problem of power consumption, which causes inconvenience for the user in how to determine the operation time of the wireless LAN module and the operation terminating time thereof.

SUMMARY OF THE INVENTION

It is an advantage of the present invention to provide a method for automatically searching a wireless LAN AP and a terminal for performing the method for a dual terminal which has a GPS receiving module, to attempt access to a wireless LAN service when a wireless LAN AP in service is provided within the location of the dual terminal checked by the GPS receiving module.

In one aspect of the present invention, in a method for searching a wireless LAN AP (access point) in a terminal having a wireless LAN module, a mobile communication module, and a GPS receiving module installed therein, a method for automatically searching a wireless LAN AP comprises: (a) acquiring location information of the wireless LAN AP provided in a service area of a base station from the base station connected through the mobile communication module; (b) consecutively tracking a current location of the terminal through the GPS receiving module; (c) determining a driving start time of the wireless LAN module through the location information of the wireless LAN AP acquired in (a) and the current location information of the terminal tracked in (b); and (d) driving the wireless LAN module to detect a beacon signal periodically output by the wireless LAN AP.

The step (a) comprises: transmitting a location register/update message to the base station through the mobile communication module when the terminal reaches the service area of the base station; receiving a response/success/failure message on the location register/update process from the base station; and acquiring location information of the wireless LAN AP provided in the base station from the response/success/failure message received from the base station.

The step (b) is performed when the location information provided in the base station is acquired in (a).

The terminal stores the location information of the wireless LAN AP acquired in (a) in a specific AP location information depository.

The location information of the wireless LAN AP comprises geographical location information of the wireless LAN AP, and radius of service information on the wireless LAN AP.

The driving start time of the wireless LAN module is determined by comparing the geographical location information of the wireless LAN AP, the radius of service information on the wireless LAN AP, and location information of the terminal tracked through the GPS receiving module.

In another aspect of the present invention, in a terminal for automatically searching a wireless LAN AP, a terminal comprises: a mobile communication module for performing wireless communication with a base station, performing a location register/update operation with the base station when the terminal reaches a service area of the base station, and acquiring location information of the wireless LAN AP provided in the service area of the base station; an AP location information storage unit for storing location information of the wireless LAN AP acquired by the mobile communication module; a GPS receiving module for tracking location information of the terminal through a GPS satellite; and a wireless LAN module for detecting a beacon signal periodically output from the wireless LAN AP and searching a wireless LAN AP when the drive is started through a comparison of location information of the wireless LAN AP stored in the AP location information storage unit with location information of the terminal tracked by the GPS receiving module.

In still another aspect of the present invention, in a computer readable recording medium for realizing a program including instructions executable by a computer for performing a method for searching a wireless LAN AP by a terminal having a wireless LAN module, a mobile communication module, and a GPS receiving module installed therein, the method comprises: (a) acquiring location information of the wireless LAN AP provided in a service area of a base station from the base station connected through the mobile communication module; (b) consecutively tracking a current location of the terminal through the GPS receiving module; (c) determining a driving start time of the wireless LAN module through the location information of the wireless LAN AP acquired in (a) and the current location information of the terminal tracked in (b); and (d) driving the wireless LAN module to detect a beacon signal periodically output by the wireless LAN AP.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
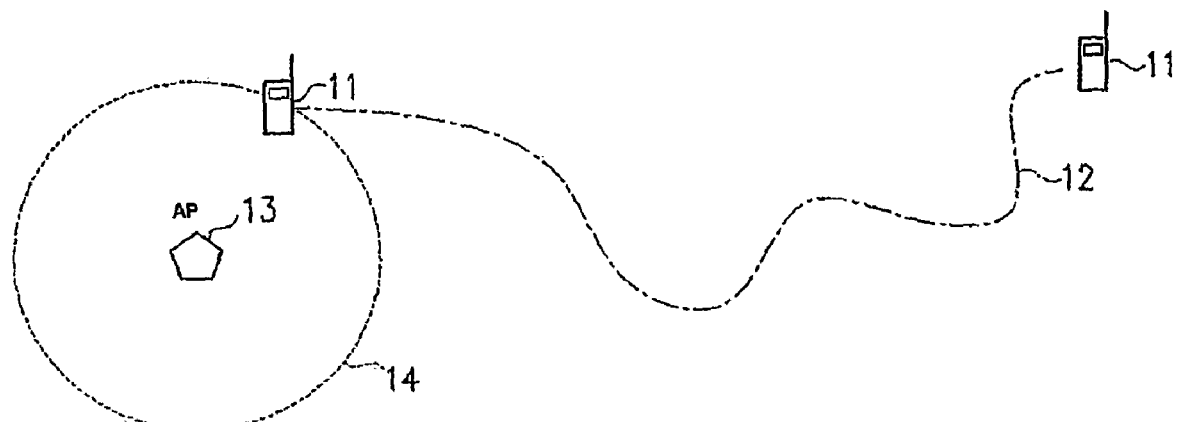
FIG. 1 shows a process for consecutively detecting a beacon signal of the wireless LAN AP while the dual terminal moves.
Figure 2:
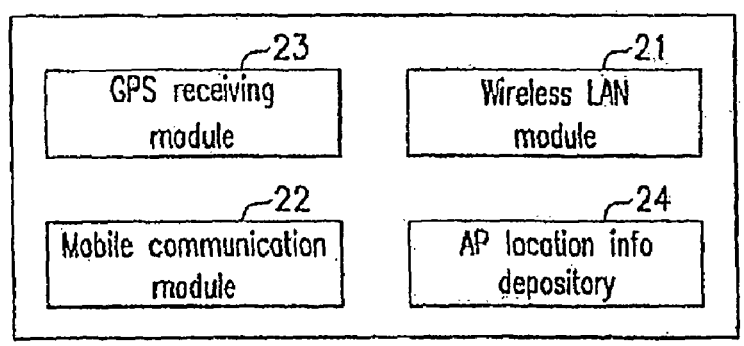
FIG. 2 shows a block diagram of a dual terminal for automatically searching a wireless LAN AP according to a preferred embodiment of the present invention.

FIG. 2 shows a block diagram of a dual terminal for automatically searching a wireless LAN AP according to a preferred embodiment of the present invention.

As shown, the dual terminal comprises a wireless LAN module 21, a mobile communication module 22, a GPS receiving module 23, and an AP location information depository 24.

The wireless LAN module 21 performs various wireless LAN (e.g., IEEE802.11b/a) access functions, the mobile communication module 22 provides various mobile communication services (IS-95/3GPP/3GPP2/GSM), and the GPS receiving module 23 acquires location information and provides it to the dual terminal.

The AP location information depository 24 stores location information on the wireless LAN AP acquired through mobile communication service providers. In this instance, the mobile communication service providers previously receive and store location information on the wireless LAN AP through wireless LAN service providers, which can be easily understood by a person skilled in the art.

Figure 3:
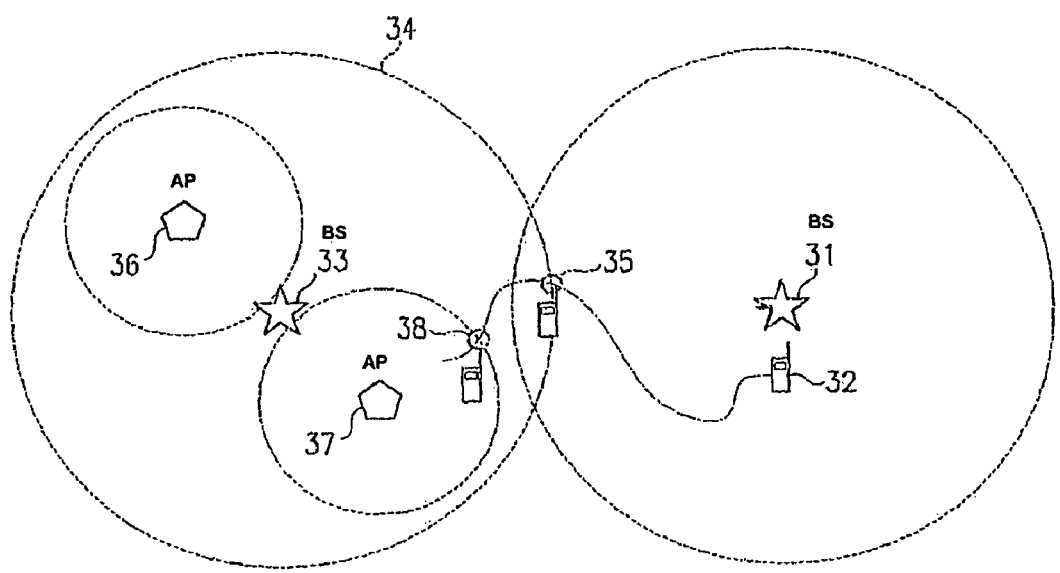
FIG. 3 shows an operational diagram where a dual terminal automatically searches a wireless LAN AP according to a preferred embodiment of the present invention.

FIG. 3 shows an operational diagram where a dual terminal automatically searches a wireless LAN AP according to a preferred embodiment of the present invention.

As shown, when the dual terminal 32 which was provided in the service area of a first base station 31 is moved to reach the location 35 for entering the service area 34 of a second base station 33, the dual terminal uses the mobile communication module 22 to update the location of the second base station 33 or register the same.

While performing the location update or the registration process, the dual terminal 32 receives the location information of third and fourth wireless LAN APs 36 and 37 located within the service area 34 of the second base station 33 from the second base station 33, and stores the same in the AP location information depository 24.

When receiving and storing the location information on the third wireless LAN APs 36 and 37, the dual terminal 32 drives the GPS receiving module 23 and consecutively tracks the current location of the dual terminal 32.

When checking through the GPS receiving module 23 that the dual terminal 32 has entered the service area 38 of the fourth wireless LAN AP 37, the dual terminal 32 drives the wireless LAN module 21 of the dual terminal 32, and starts detecting the beacon signal periodically output by the fourth wireless LAN AP 37. When the wireless LAN module 21 of the dual terminal 32 detects the beacon signal of the fourth wireless LAN AP 37, the dual terminal 32 receives the data service through the wireless LAN service provided by the fourth wireless LAN AP 37.

When no location information on the wireless LAN AP is received while performing the location update or registration process through the second base station 33, the dual terminal 32 does not drive the GPS reviving module 23 of the dual terminal within the service area 34 of the second base station 33.

Figure 4:
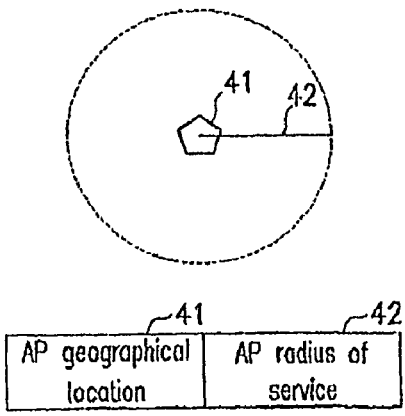
FIG. 4 shows a configuration diagram of an AP location information depository in the dual terminal shown in FIG. 2.

FIG. 4 shows a configuration diagram of the AP location information depository 24 in the dual terminal shown in FIG. 2.

As shown, the AP location information depository 24 comprises a section for storing geographical information 41 of the wireless LAN AP and a section for storing a radius of service 42 of the wireless LAN AP.

In particular, the geographical information 41 of the wireless LAN AP has latitude and longitude information accurately measured through the GPS. The radius of service 42 of the wireless LAN AP has a 10 m unit of calculation, and the geographical information 41 may have a measured radius of service of the actual wireless LAN AP in order to acquire more accurate information on the radius of service.

Figure 5:
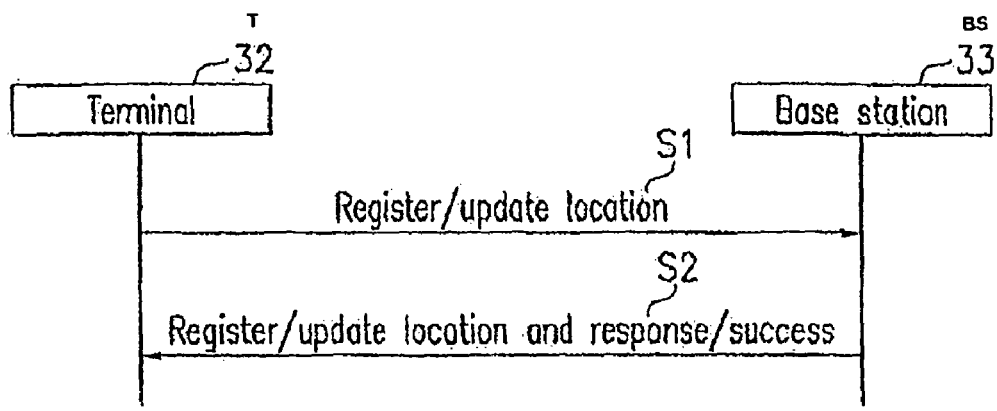
FIG. 5 shows a process for the dual terminal shown in FIG. 3 to communicate signal messages with a base station when the dual terminal enters the service area of the base station.

FIG. 5 shows a process for the dual terminal 32 shown in FIG. 3 to communicate signal messages with a base station 33 when the dual terminal enters the service area 34 of the base station 33.

As shown, the dual terminal having entered the location registration area 34 of the base station 33 transmits a location register/update message to the base station 33 in order to register the location of the dual terminal in step S1.

On receiving the message, the base station 33 transmits a location register/update response/success/failure message to the dual terminal 32 in response to the location register message of the dual terminal 32 in step S2.

On receiving the location register/update response/success/failure message from the base station 33, the dual terminal 32 extracts location information of the wireless LAN AP provided in the location register area included in the location register/update response/success/failure message, and stores the same in the wireless LAN AP location information depository 24.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the present invention, power consumption is reduced since the wireless LAN AP in service is not searched every instant, and user's inconvenience caused by searching the wireless LAN AP is removed since the dual terminal automatically searches the wireless LAN AP.

What is claimed is:

1. In a method for searching a wireless LAN AP (access point) in a terminal having a wireless LAN module, a mobile communication module, and a GPS receiving module installed therein, a method for automatically searching a wireless LAN AP comprising:
   (a) acquiring location information of the wireless LAN AP provided in a service area of a base station from the base station connected through the mobile communication module;
   (b) consecutively tracking a current location of the terminal through the GPS receiving module;
   (c) determining a driving start time of the wireless LAN module through the location information of the wireless LAN AP acquired in (a) and the current location information of the terminal tracked in (b),
   wherein the driving start time is activated when the current location information of the terminal tracked in (b) is within a predetermined radius of service information of the location information of the wireless LAN AP acquired in (a);
   (d) driving the wireless LAN module to detect a beacon signal periodically output by the wireless LAN AP, and
   wherein the location information of the wireless LAN AP comprises geographical location Information of the wireless LAN AP and the radius of service information on the wireless LAN AP.

2. The method of claim 1, wherein (a) comprises: transmitting a location register/update message to the base station through the mobile communication module when the terminal reaches the service area of the base station; receiving a response/success/failure message on the location register/update process from the base station; and acquiring location information of the wireless LAN AP provided in the base station from the response/success/failure message received from the base station.

3. The method of claim 1 or 2, wherein (b) is performed when the location information provided in the base station is acquired in (a).

4. The method of claim 1 or 2, wherein the terminal stores the location information of the wireless LAN AP acquired in (a) in a specific AP location information depository.

5. The method of claim 1, wherein the driving start time of the wireless LAN module is determined by comparing the geographical location information of the wireless LAN AP, the radius of service information on the wireless LAN AP, and location information of the terminal tracked through the GPS receiving module.

6. In a terminal for automatically searching a wireless LAN AP (access point), a terminal comprising:
   a mobile communication module for performing wireless communication with a base station, performing a location register/update operation with the base station when the terminal reaches a service area of the base station, and acquiring location information of the wireless LAN AP provided in the service area of the base station;
   an AP location information storage unit for storing location information of the wireless LAN AP acquired by the mobile communication module;
   a GPS receiving module for tracking location information of the terminal through a GPS satellite;
   a wireless LAN module for detecting a beacon signal periodically output from the wireless LAN AP and searching a wireless LAN AP when the drive is started through a comparison of location information of the wireless LAN AP stored in the AP location information storage unit with location information of the terminal tracked by the GPS receiving module when the terminal is within a predetermined radius of service information of the location information of the wireless LAN AP acquired, and
   wherein the location information of the wireless LAN AP comprises geographical location information of the wireless LAN AP and the radius of service information on the wireless LAN AP.

7. The terminal of claim 6, wherein the mobile communication module acquires location information of the wireless LAN AP within a response/success/failure message transmitted by the base station with respect to a location register/update message transmitted to the base station for the purpose of a location register/update process of the terminal.

8. The terminal of claim 6, wherein the wireless LAN AP is not automatically searched when the mobile communication module fails to acquire location information of the wireless LAN AP provided in the base station.

9. In a computer readable recording medium for realizing a program including instructions executable by a computer for performing a method for searching a wireless LAN AP (access point) by a terminal having a wireless LAN module, a mobile communication module, and a GPS receiving module installed therein, the method comprising:
   (a) acquiring location information of the wireless LAN AP provided in a service area of a base station from the base station connected through the mobile communication module;
   (b) consecutively tracking a current location of the terminal through the GPS receiving module;
   (c) determining a driving start time of the wireless LAN module through the location information of the wireless LAN AP acquired in (a) and the current location information of the terminal tracked in (b),
   wherein the driving start time is activated when the current location information of the terminal tracked in (b) is within a predetermined radius of service information of the location information of the wireless LAN AP acquired in (a);
   (d) driving the wireless LAN module to detect a beacon signal periodically output by the wireless LAN AP, and
   wherein the location information of the wireless LAN AP comprises geographical location information of the wireless LAN AP and the radius of service information on the wireless LAN AP.

* * * * *